US012760139B2

(12) United States Patent
Tanaka et al.

(10) Patent No.: US 12,760,139 B2
(45) Date of Patent: Oct. 13, 2026

(54) ENCAPSULATION RESIN

(71) Applicant: DAIKIN INDUSTRIES, LTD., Osaka (JP)

(72) Inventors: Yoshito Tanaka, Osaka (JP); Makoto Matsuura, Osaka (JP); Yuuki Suzuki, Osaka (JP); Akitoshi Ogata, Osaka (JP); Yosuke Kishikawa, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 923 days.

(21) Appl. No.: 17/858,431

(22) Filed: Jul. 6, 2022

(65) Prior Publication Data

US 2022/0332880 A1 Oct. 20, 2022

Related U.S. Application Data

(63) Continuation of application No. PCT/JP2021/000256, filed on Jan. 6, 2021.

(30) Foreign Application Priority Data

Jan. 8, 2020 (JP) ................................ 2020-001646

(51) Int. Cl.
*C08G 4/00* (2006.01)

(52) U.S. Cl.
CPC ........... *C08G 4/00* (2013.01); *C08G 2261/14* (2013.01); *C08G 2261/62* (2013.01)

(58) Field of Classification Search
CPC ........... C08G 2261/1424; C08G 65/16; C08G 2261/14; C08G 4/00; C08G 2261/62
See application file for complete search history.

(56) References Cited

U.S. PATENT DOCUMENTS

| | | | | |
|---|---|---|---|---|
| 3,308,107 | A | 3/1967 | Selman et al. | |
| 3,450,716 | A | 6/1969 | Selman et al. | |
| 4,429,143 | A | 1/1984 | Anderson et al. | |
| 6,201,085 | B1 | 3/2001 | Matsukura et al. | |
| 6,284,379 | B1 | 9/2001 | Matsukura et al. | |
| 6,491,979 | B1 | 12/2002 | Yamaguchi et al. | |
| 2006/0189788 | A1* | 8/2006 | Araki ..................... | C08G 65/14 528/425 |
| 2006/0194936 | A1 | 8/2006 | Eriguchi et al. | |
| 2008/0015298 | A1 | 1/2008 | Xiong et al. | |
| 2008/0293863 | A1 | 11/2008 | Otozawa et al. | |
| 2010/0048956 | A1 | 2/2010 | Isaka et al. | |
| 2010/0080903 | A1 | 4/2010 | Tamitsuji et al. | |
| 2010/0134879 | A1 | 6/2010 | Yoshihara et al. | |
| 2011/0105686 | A1 | 5/2011 | Kashiwagi | |
| 2012/0156504 | A1 | 6/2012 | Takebe et al. | |
| 2012/0208038 | A1 | 8/2012 | Kondo et al. | |
| 2013/0199828 | A1 | 8/2013 | Nakabayashi et al. | |
| 2014/0323661 | A1 | 10/2014 | Avataneo et al. | |
| 2015/0243856 | A1 | 8/2015 | Yamada et al. | |
| 2015/0299506 | A1 | 10/2015 | Fan et al. | |
| 2017/0009000 | A1 | 1/2017 | Hendershot et al. | |
| 2017/0114242 | A1 | 4/2017 | Lloyd et al. | |
| 2017/0114253 | A1 | 4/2017 | Nakayama et al. | |
| 2019/0194475 | A1 | 6/2019 | Takeuchi et al. | |
| 2019/0312202 | A1 | 10/2019 | Yokoyama et al. | |
| 2022/0259453 | A1 | 8/2022 | Morita et al. | |

FOREIGN PATENT DOCUMENTS

| | | |
|---|---|---|
| CN | 106687863 | 5/2017 |
| CN | 108909091 | 11/2018 |
| EP | 1 724 291 | 11/2006 |
| EP | 2 821 846 | 1/2015 |
| EP | 4 053 173 | 9/2022 |

(Continued)

OTHER PUBLICATIONS

Mikĕ, F. et al., "Synthesis and Characterization of an Amorphous Perfluoropolymer: Poly(perfluoro-2-methylene-4-methyl-1,3-dioxolane)", Macromolecules, 2005, 38, pp. 4237-4245.

International Search Report issued Mar. 30, 2021 in International (PCT) Application No. PCT/JP2021/000252.

International Preliminary Report on Patentability and Written Opinion of the Searching Authority issued Jul. 12, 2022 in International (PCT) Application No. PCT/JP2021/000252.

International Search Report issued Apr. 6, 2021 in International (PCT) Application No. PCT/JP2021/000253.

International Preliminary Report on Patentability and Written Opinion of the Searching Authority issued Jul. 12, 2022 in International (PCT) Application No. PCT/JP2021/000253.

(Continued)

*Primary Examiner* — Gregory Listvoyb
(74) *Attorney, Agent, or Firm* — Wenderoth, Lind & Ponack, L.L.P.

(57) ABSTRACT

An object of the present disclosure is to provide an encapsulation resin in which the occurrence of cracks is suppressed when the resin is used for encapsulation of ultraviolet light-emitting elements. Another object of the present disclosure is to provide an encapsulation resin composition for supplying the encapsulation resin. The present disclosure relates to an encapsulation resin for light-emitting elements, comprising a fluoropolymer, wherein the fluoropolymer comprises, as a main component, a monomer unit represented by formula (1):

(1)

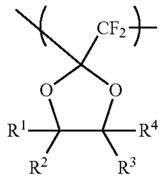

wherein $R^1$ to $R^4$ are each independently a fluorine atom, a fluoroalkyl group, or a fluoroalkoxy group.

11 Claims, 3 Drawing Sheets

(56) References Cited

FOREIGN PATENT DOCUMENTS

| | | | |
|---|---|---|---|
| EP | 4 056 369 | 9/2022 | |
| JP | 43-29154 | 12/1968 | |
| JP | 58-69877 | 4/1983 | |
| JP | 5-339255 | 12/1993 | |
| JP | 2002-38075 | 2/2002 | |
| JP | 2004-59763 | 2/2004 | |
| JP | 2005-319661 | 11/2005 | |
| JP | 2006-180450 | 7/2006 | |
| JP | 2006-290779 | 10/2006 | |
| JP | 2007-71839 | 3/2007 | |
| JP | 2007-517083 | 6/2007 | |
| JP | 2007-312551 | 11/2007 | |
| JP | 2008-40262 | 2/2008 | |
| JP | 2009-126879 | 6/2009 | |
| JP | 2010-131569 | 6/2010 | |
| JP | 2021-24901 | 2/2012 | |
| JP | 2012-46674 | 3/2012 | |
| JP | 2012-158726 | 8/2012 | |
| JP | 2012-214752 | 11/2012 | |
| JP | 2012-214753 | 11/2012 | |
| JP | 2014-067609 | 4/2014 | |
| JP | 2015-133505 | 7/2015 | |
| JP | 2020-122068 | 8/2020 | |
| JP | 2020-128520 | 8/2020 | |
| TW | 406091 | 9/2000 | |
| WO | WO-8912071 A1 * | 12/1989 | ............ C08F 234/02 |
| WO | 2000/004109 | 1/2000 | |
| WO | 2002/004534 | 1/2002 | |
| WO | 2005/042511 | 5/2005 | |
| WO | 2005/054313 | 6/2005 | |
| WO | 2005/095471 | 10/2005 | |
| WO | 2007/077722 | 7/2007 | |
| WO | 2008/069301 | 6/2008 | |
| WO | 2008/133088 | 11/2008 | |
| WO | 2008/136346 | 11/2008 | |
| WO | 2009/104699 | 8/2009 | |
| WO | 2010/055758 | 5/2010 | |
| WO | 2012/161162 | 11/2012 | |
| WO | 2014/065001 | 5/2014 | |
| WO | 2016/010043 | 1/2016 | |
| WO | 2018/066527 | 4/2018 | |
| WO | 2019/131290 | 7/2019 | |

OTHER PUBLICATIONS

International Search Report issued Mar. 9, 2021 in International (PCT) Application No. PCT/JP2021/000254.

International Preliminary Report on Patentability and Written Opinion of the Searching Authority issued Jul. 12, 2022 in International (PCT) Application No. PCT/JP2021/000254.

International Search Report issued Feb. 22, 2021 in International (PCT) Application No. PCT/JP2021/000255.

International Preliminary Report on Patentability and Written Opinion of the Searching Authority issued Jul. 12, 2022 in International (PCT) Application No. PCT/JP2021/000255.

International Search Report issued Apr. 6, 2021 in International (PCT) Application No. PCT/JP2021/000256.

International Preliminary Report on Patentability and Written Opinion of the Searching Authority issued Jul. 12, 2022 in International (PCT) Application No. PCT/JP2021/000256.

International Search Report issued Mar. 23, 2021 in International (PCT) Application No. PCT/JP2021/000259.

International Preliminary Report on Patentability and Written Opinion of the Searching Authority issued Jul. 12, 2022 in International (PCT) Application No. PCT/JP2021/000259.

Yoshitaka Saito & Akira Tsukamoto "Recent Applications of Fluororesins", Polymers, vol. 41, 1992, pp. 770-773, with partial English translation.

Extended European Search Report issued Dec. 15, 2023 in European Application No. 21738168.0.

Fang et al. "Mechanical and optical properties of the copolymers of perfluoro(2-methylene-4-methyl-1,3-dioxolane) and chlorotrifluoroethylene", Journal of Fluorine Chemistry, 2018, vol. 214, pp. 63-67.

Extended European Search Report issued Dec. 22, 2023 in European Application No. 21737961.9.

Extended European Search Report issued Dec. 22, 2023 in European Application No. 21738833.9.

Extended European Search Report issued Jan. 19, 2024 in European patent application No. 21738337.1.

Extended European Search Report issued Jan. 26, 2024 in European patent application No. 21738041.9.

Extended European Search Report issued Jan. 26, 2024 in European patent application No. 21738566.5.

Koike, Kotaro, et al., "Synthesis and characterization of copolymers of perfluoro(2-methylene-4,5-dimethyl-1,3-dioxolane) and perfluoro(2-methylene-1,3-dioxolane)," Journal of Fluorine Chemistry, vol. 156, Oct. 18, 2013, pp. 198-202.

Yang, Yu, et al., "Novel Amorphous Perfluorocopolymeric System: Copolymers of Perfluoro-2-methylene-1,3-dioxolane Derivatives," Journal of Polymer Science: Part A: Polymer Chemistry, vol. 44, Jan. 26, 2006, pp. 1613-1618.

Okamoto, Y., et al., "The effect of fluorine substituents on the polymerization mechanism of 2-methylene-1,3-dioxolane and properties of the polymer products," Journal of Fluorine Chemistry, vol. 128, Dec. 15, 2006, pp. 202-206.

Chiang, Hao-Chun, et al., "Mechanical, optical and gas transport properties of poly(perfluoro-2-methylene-4-methyl-1,3-dioxolane) membrane containing perfluoropolyether as a plasticizer," Journal of Fluorine Chemistry, vol. 236, May 22, 2020 (4 pages).

* cited by examiner

ENCAPSULATION RESIN

TECHNICAL FIELD

The present disclosure relates to an encapsulation resin, an encapsulation resin composition, and the like.

BACKGROUND ART

Many light-emitting element packages of light-emitting diodes (LEDs) and the like include at least a light-emitting element, a dam, and an encapsulant. Encapsulants are used to protect light-emitting elements etc. from impact, dust in the air, moisture, and the like. Epoxy resins, silicone resins, etc. having transparency are used as encapsulants. However, epoxy resins, silicone resins, etc. have the problem of cracking in encapsulation of, for example, ultraviolet light-emitting elements (UV-LEDs). Quartz or the like is also used for encapsulation of ultraviolet light-emitting elements, but is expensive. Further, a fluororesin having transparency is also studied for encapsulation of ultraviolet light-emitting elements (Patent Literature 1).

CITATION LIST

Patent Literature

PTL 1: JP2015-133505A

SUMMARY

The present disclosure includes, for example, the following embodiment.

An encapsulation resin for light-emitting elements, comprising a fluoropolymer, wherein the fluoropolymer comprises, as a main component, a monomer unit represented by formula (1):

(1)

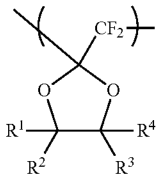

wherein $R^1$ to $R^4$ are each independently a fluorine atom, a fluoroalkyl group, or a fluoroalkoxy group.

Advantageous Effects

The present disclosure is capable of providing a fluoropolymer-containing encapsulation resin in which the occurrence of cracks is suppressed. The present disclosure is capable of providing a fluoropolymer-containing encapsulation resin having a high hardness. The present disclosure is capable of providing a resin composition having a high fluoropolymer concentration. The present disclosure is capable of providing a resin composition having a low global warming potential (GWP).

DESCRIPTION OF EMBODIMENTS

Figure 1:
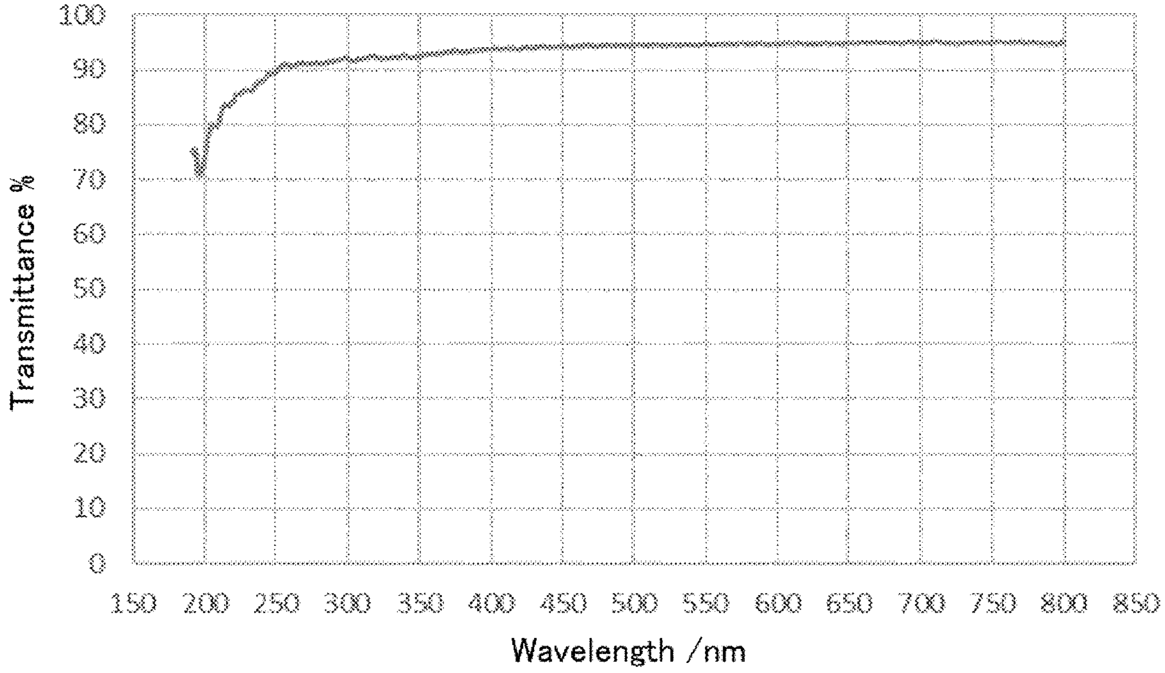
FIG. 1 is a chart showing the transmittance of the film tested in Example 1 at each wavelength.

The above overview of the present disclosure is not intended to describe each of the disclosed embodiments or all of the implementations of the present disclosure.

The following description of the present disclosure illustrates embodiments of examples in more detail.

In several parts of the present disclosure, guidance is provided through examples, and these examples can be used in various combinations.

In each case, the group of examples can function as a non-exclusive and representative group.

All publications, patents, and patent applications cited herein are incorporated herein by reference in their entirety.

Terms

Unless otherwise specified, the symbols and abbreviations in the present specification can be understood in the sense commonly used in the technical field to which the present disclosure pertains, according to the context of the present specification.

In the present specification, the terms "comprise" and "contain" are used with the intention of including the terms "consisting essentially of" and "consisting of."

Unless otherwise specified, the steps, treatments, or operations described in the present specification can be performed at room temperature. In the present specification, room temperature can mean a temperature within the range of 10° C. or higher and 40° C. or lower.

In the present specification, the phrase "$C_n$-$C_m$" (n and m are each a number) indicates that the number of carbon atoms is n or more and m or less, as would be commonly understood by a person skilled in the art.

In the present specification, the expression "thickness" or simply "film thickness" with respect to a film means an average film thickness. The "average film thickness" is determined as follows.

Average Film Thickness

The average film thickness is the average value of a thickness measured 5 times with a micrometer. When measuring the thickness of a film itself is difficult, such as when a film formed on a base material of a substrate etc. cannot be peeled off, the average film thickness is calculated by measuring the thickness of the base material before film formation and the thickness of the base material after film formation 5 times each with a micrometer, and subtracting the average value of the thickness before film formation from the average value of the thickness after film formation.

When the measurement cannot be performed with a micrometer, the film thickness obtained by measuring the line profile of the cut surface of a film to be measured with an atomic force microscope (AFM) is defined as the average film thickness.

Specifically, the average film thickness is a value determined by the method described in a specific example of the present disclosure.

In the present specification, the simple expression "molecular weight" means mass average molecular weight. The mass average molecular weight is determined as follows.

Mass Average Molecular Weight

The mass average molecular weight is measured by using the following GPC analysis method. Specifically, the mass average molecular weight is a value determined by the method described in a specific example of the present disclosure.

GPC Analysis Method

Sample Preparation Method

A polymer is dissolved in perfluorobenzene to prepare a 2 mass % polymer solution, and the polymer solution is passed through a membrane filter (0.22 μm) to obtain a sample solution.

Measurement Method

Standard sample for measurement of molecular weight: polynethyl methacrylate

Detection Method: RI (Differential Refractometer)

In the present specification, the "indentation hardness" and "indentation elastic modulus" are determined as follows.

Indentation Hardness and Indentation Elastic Modulus

The indentation hardness ($H_{IT}$; indentation hardness) of a sample is measured using an ENT-2100 ultra-fine hardness tester produced by Nanotec Corporation. The indentation elastic modulus is also measured at the same time. The test is performed by adjusting the indentation depth to be 1/10 or less of the thickness. Specifically, the indentation hardness and indentation elastic modulus are values determined by the method described in a specific example of the present disclosure.

In the present specification, the "total light transmittance" and "haze" are determined as follows.

Measurement Method for Total Light Transmittance and Haze

The total light transmittance and haze are measured using an NDH 7000SPII haze meter (produced by Nippon Denshoku Industries Co., Ltd.) in accordance with JIS K7136 (haze value) and JIS K7361-1 (total light transmittance). A film with an average film thickness of 100 μm is used as the sample to be measured. Specifically, the total light transmittance and haze are values determined by the method described in a specific example of the present disclosure.

In the present specification, the "transmittance" at each wavelength is determined as follows.

Transmittance at Each Wavelength

The transmittance at a specific wavelength of a sample is measured using a Hitachi U-4100 spectrophotometer. A film with an average film thickness of 100 μm is used as the sample. An integrating sphere detector is used as the detector. Specifically, the transmittance is a value determined by the method described in a specific example of the present disclosure.

In the present specification, the "refractive index" is determined as follows.

Refractive Index

The refractive index of a sample at 23° C. is measured with an Abbe refractive index meter (NAR-1T SOLID, produced by Atago Co., Ltd.). The wavelength is a wavelength approximate to D-line because of the use of the LED attached to the device. Specifically, the refractive index is a value determined by the method described in a specific example of the present disclosure.

In the present specification, the Abbe rate at each wavelength is determined as follows.

Abbe Number

The Abbe number of a sample at 23° C. is measured with an Abbe refractive index meter (NAR-1T SOLID, produced by Atago Co., Ltd.). Specifically, the Abbe number is a value determined by the method described in specific examples of the present disclosure.

In the present specification, the "water absorption" is determined as follows.

Water Absorption (24° C.)

The weight of a sample that has been thoroughly dried beforehand is measured and set as W0. The sample is then completely immersed in water at 24° C. that is 100 times or greater than W0 by mass. The weight of the sample after 24 hours is measured and set as W24. The water absorption is determined from the following formula.

$$\text{Water absorption (\%)}=100\times(W24-W0)/W0$$

Specifically, the water absorption is a value determined by the method described in a specific example of the present disclosure.

Water Absorption (60° C.)

The weight of a sample that has been thoroughly dried beforehand is measured and set as W0. The sample is then completely immersed in water at 60° C. that is 100 times or greater than W0 by mass. The weight of the sample after 24 hours is measured and set as W24. The water absorption is determined from the following formula.

$$\text{Water absorption (\%)}=100\times(W24-W0)/W0$$

Specifically, the water absorption is a value determined by the method described in a specific example of the present disclosure.

In the present specification, the "tensile elastic modulus" is determined as follows.

Tensile Elastic Modulus

A sample (length: 30 mm, width: 5 mm, thickness: 0.1 mm) is measured with a DVA220 dynamic viscoelasticity measurement device produced by IT Measurement Control Co., Ltd., under the conditions of a tensile mode, a grip width of 20 mm, a measurement temperature of 25° C. to 150° C., a temperature-increasing rate of 2° C./min, and a frequency of 1 Hz. The elastic modulus value at 25° C. is defined as a tensile elastic modulus. Specifically, the tensile elastic modulus is a value determined by the method described in a specific example of the present disclosure.

In the present specification, the "tensile strength" is determined as follows.

Tensile Strength

The tensile strength of a sample is measured using an AGS-100NX autograph produced by Shimadzu Corporation. The sample is cut into a dumbbell shape 5B as stated in JIS K 7162. The measurement is performed under the conditions of a chuck-to-chuck distance of 12 mm, a crosshead speed of 1 mm/min, and room temperature. Specifically, the tensile strength is a value determined by the method described in a specific example of the present disclosure.

In the present specification, the "thermal decomposition temperature" is determined as follows.

Thermal Decomposition Temperature

The temperatures at which the mass loss percentage of a sample becomes 0.1% and 5% are measured at a temperature-increasing rate of 10° C./minute in an air atmosphere using a thermogravimetric-differential thermal analyzer (Hitachi High-Tech Science Corporation; STA7200). Specifically, the thermal decomposition temperature is a value determined by the method described in a specific example of the present disclosure.

In the present specification, the "glass transition temperature" is determined as follows.

Glass Transition Temperature (Tg)

The temperature is increased (first run), decreased, and then increased (second run) at 10° C./minute in the temperature range of 30° C. or higher and 200° C. or lower using a DSC (differential scanning calorimeter; Hitachi High-Tech Science Corporation, DSC7000); the midpoint of the endothermic curve in the second run is determined to be the glass transition temperature (° C.). Specifically, the glass transition temperature is a value determined by the method described in a specific example of the present disclosure.

In the present specification, the "coefficient of linear expansion" is determined as follows.

Coefficient of Linear Expansion

The temperature of a sample is increased from room temperature to 150° C. (1st up), decreased to room temperature, and then increased to 150° C. (2nd up) at 2° C./minute using a thermomechanical analyzer (TMA8310; produced by Rigaku Corporation). The average coefficient of linear expansion at 25° C. or higher and 80° C. or lower in the 2nd up is determined and defined as the coefficient of linear expansion. Specifically, the coefficient of linear expansion is a value determined by the method described in a specific example of the present disclosure.

In the present specification, unless otherwise specified, examples of "alkyl" include linear or branched $C_1$-$C_{10}$ alkyl, such as methyl, ethyl, propyl, isopropyl, butyl, isobutyl, sec-butyl, tert-butyl, pentyl, isopentyl, neopentyl, hexyl, heptyl, octyl, nonyl, and decyl.

In the present specification, unless otherwise specified, "fluoroalkyl" is alkyl in which at least one hydrogen atom is replaced with a fluorine atom. "Fluoroalkyl" can be linear or branched fluoroalkyl.

The number of carbon atoms in "fluoroalkyl" can be, for example, 1 to 12, 1 to 6, 1 to 5, 1 to 4, 1 to 3, 6, 5, 4, 3, 2, or 1.

The number of fluorine atoms in "fluoroalkyl" can be 1 or more (e.g., 1 to 3, 1 to 5, 1 to 9, 1 to 11, or 1 to the maximum substitutable number).

"Fluoroalkyl" includes perfluoroalkyl.

"Perfluoroalkyl" is alkyl in which all hydrogen atoms are replaced with fluorine atoms.

Examples of perfluoroalkyl include trifluoromethyl ($CF_3$—), pentafluoroethyl ($C_2F_5$—), heptafluoropropyl ($CF_3CF_2CF_2$—), and heptafluoroisopropyl ($(CF_3)_2CF$—).

Specific examples of "fluoroalkyl" include monofluoromethyl, difluoromethyl, trifluoromethyl ($CF_3$—), 2,2,2-trifluoroethyl ($CF_3CH_2$—), perfluoroethyl ($C_2F_5$—), tetrafluoropropyl (e.g., $HCF_2CF_2CH_2$—), hexafluoropropyl (e.g., $(CF_3)_2CH$—), perfluorobutyl (e.g., $CF_3CF_2CF_2CF_2$—), octafluoropentyl (e.g., $HCF_2CF_2CF_2CF_2CH_2$—), perfluoropentyl (e.g., $CF_3CF_2CF_2CF_2CF_2$—), perfluorohexyl (e.g., $CF_3CF_2CF_2CF_2CF_2CF_2$—), and the like.

In the present specification, unless otherwise specified, "alkoxy" can be a group represented by RO—, wherein R is alkyl (e.g., $C_1$-$C_{10}$ alkyl).

Examples of "alkoxy" include linear or branched $C_1$-$C_{10}$ alkoxy, such as methoxy, ethoxy, propoxy, isopropoxy, butoxy, isobutoxy, sec-butoxy, tert-butoxy, pentyloxy, isopentyloxy, neopentyloxy, hexyloxy, heptyloxy, octyloxy, nonyloxy, and decyloxy.

In the present specification, unless otherwise specified, "fluoroalkoxy" is alkoxy in which at least one hydrogen atom is replaced with a fluorine atom. "Fluoroalkoxy" can be linear or branched fluoroalkoxy.

The number of carbon atoms in "fluoroalkoxy" can be, for example, 1 to 12, 1 to 6, 1 to 5, 1 to 4, 1 to 3, 6, 5, 4, 3, 2, or 1.

The number of fluorine atoms in "fluoroalkoxy" can be 1 or more (e.g., 1 to 3, 1 to 5, 1 to 9, 1 to 11, or 1 to the maximum substitutable number).

"Fluoroalkoxy" includes perfluoroalkoxy.

"Perfluoroalkoxy" is alkoxy in which all hydrogen atoms are replaced with fluorine atoms.

Examples of "perfluoroalkoxy" include trifluoromethoxy ($CF_3O$—), pentafluoroethoxy ($C_2F_5O$—), heptafluoropropoxy ($CF_3CF_2CF_2O$—), and heptafluoroisopropoxy ($(CF_3)_2CFO$—).

Specific examples of "fluoroalkoxy" include monofluoromethoxy, difluoromethoxy, trifluoromethoxy, 2,2,2-trifluoroethoxy ($CF_3CH_2O$—), perfluoroethoxy ($C_2F_5O$—), tetrafluoropropyloxy (e.g. $HCF_2CF_2CH_2O$—), hexafluoropropyloxy (e.g., $(CF_3)_2CHO$—), perfluorobutyloxy (e.g., $CF_3CF_2CF_2CF_2O$—), octafluoropentyloxy (e.g., $HCF_2CF_2CF_2CF_2CH_2O$—), perfluoropentyloxy (e.g., $CF_3CF_2CF_2CF_2CF_2O$—), perfluorohexyloxy (e.g., $CF_3CF_2CF_2CF_2CF_2CF_2O$—), and the like.

Encapsulation Resin for Light-Emitting Elements

One embodiment of the present disclosure is an encapsulation resin for light-emitting elements, the resin comprising a specific fluoropolymer.

In the encapsulation resin, the occurrence of cracks is suppressed since the resin comprises the fluoropolymer.

The encapsulation resin has a high hardness since it comprises the fluoropolymer.

The encapsulation resin has high transparency since it comprises the fluoropolymer.

The encapsulation resin is not easily colored even after a long period of use since the glass transition temperature (Tg) of the fluoropolymer is as high as 110° C. or higher.

The fluoropolymer contained in the encapsulation resin comprises, as a main component, a monomer unit represented by formula (1):

(1)

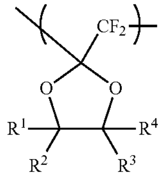

wherein $R^1$ to $R^4$ are each independently a fluorine atom, a fluoroalkyl group, or a fluoroalkoxy group (this monomer unit may be referred to as "unit (1)" in the present specification).

In the present specification, phrases such as "comprising a monomer unit as a main component" mean that the percentage of the specific monomer unit is 50 mol % or more based on the total monomer units in a polymer.

The encapsulation resin comprises the fluoropolymer, which is advantageous in terms of crack suppression, hardness, etc. of the encapsulation resin.

Unit (1) as a monomer unit constituting the fluoropolymer may be used singly or in a combination of two or more.

The percentage of unit (1) may be, for example, 70 mol % or more, preferably 80 mol % or more, more preferably 90 mol % or more, and particularly preferably 100 mol %, based on the total monomer units of the fluoropolymer.

In each of $R^1$ to $R^4$, fluoroalkyl can be, for example, linear or branched $C_1$-$C_5$ fluoroalkyl, linear or branched $C_1$-$C_4$ fluoroalkyl, linear or branched $C_1$-$C_3$ fluoroalkyl, or $C_1$-$C_2$ fluoroalkyl.

The linear or branched $C_1$-$C_5$ fluoroalkyl is preferably linear or branched $C_1$-$C_5$ perfluoroalkyl.

The linear or branched $C_1$-$C_4$ fluoroalkyl is preferably linear or branched $C_1$-$C_4$ perfluoroalkyl.

The linear or branched $C_1$-$C_3$ fluoroalkyl is preferably linear or branched $C_1$-$C_3$ perfluoroalkyl.

The $C_1$-$C_2$ fluoroalkyl is preferably $C_1$-$C_2$ perfluoroalkyl.

In each of $R^1$ to $R^4$, fluoroalkoxy can be, for example, linear or branched $C_1$-$C_5$ fluoroalkoxy, linear or branched $C_1$-$C_4$ fluoroalkoxy, linear or branched $C_1$-$C_3$ fluoroalkoxy, or $C_1$-$C_2$ fluoroalkoxy.

The linear or branched $C_1$-$C_5$ fluoroalkoxy is preferably linear or branched $C_1$-$C_5$ perfluoroalkoxy.

The linear or branched $C_1$-$C_4$ fluoroalkoxy is preferably linear or branched $C_1$-$C_4$ perfluoroalkoxy.

The linear or branched $C_1$-$C_3$ fluoroalkoxy is preferably linear or branched $C_1$-$C_3$ perfluoroalkoxy.

The $C_1$-$C_2$ fluoroalkoxy is preferably $C_1$-$C_2$ perfluoroalkoxy.

$R^1$ to $R^4$ can be each independently fluorine, linear or branched $C_1$-$C_5$ fluoroalkyl, or linear or branched $C_1$-$C_5$ fluoroalkoxy.

$R^1$ to $R^4$ can be each independently fluorine, linear or branched $C_1$-$C_5$ perfluoroalkyl, or linear or branched $C_1$-$C_5$ perfluoroalkoxy.

$R^1$ to $R^4$ can be each independently fluorine, linear or branched $C_1$-$C_4$ fluoroalkyl, or linear or branched $C_1$-$C_4$ fluoroalkoxy.

$R^1$ to $R^4$ can be each independently fluorine, linear or branched $C_1$-$C_4$ perfluoroalkyl, or linear or branched $C_1$-$C_4$ perfluoroalkoxy.

$R^1$ to $R^4$ can be each independently fluorine, linear or branched $C_1$-$C_3$ fluoroalkyl, or linear or branched $C_1$-$C_3$ fluoroalkoxy.

$R^1$ to $R^4$ can be each independently fluorine, linear or branched $C_1$-$C_3$ perfluoroalkyl, or linear or branched $C_1$-$C_3$ perfluoroalkoxy.

$R^1$ to $R^4$ can be each independently fluorine, $C_1$-$C_2$ fluoroalkyl, or $C_1$-$C_2$ fluoroalkoxy.

$R^1$ to $R^4$ can be each independently fluorine, $C_1$-$C_2$ perfluoroalkyl, or $C_1$-$C_2$ perfluoroalkoxy.

$R^1$ to $R^4$ can be each independently fluorine, trifluoromethyl, pentafluoroethyl, or trifluoromethoxy.

At least one of $R^1$ to $R^4$ can be fluorine, and the other groups in $R^1$ to $R^4$ can be independently $C_1$-$C_2$ perfluoroalkyl or $C_1$-$C_2$ perfluoroalkoxy when two or more such other groups are present.

At least two of $R^1$ to $R^4$ can be fluorine, and the other groups in $R^1$ to $R^4$ can be independently $C_1$-$C_2$ perfluoroalkyl or $C_1$-$C_2$ perfluoroalkoxy when two or more such other groups are present.

At least three of $R^1$ to $R^4$ can be fluorine, and the other group in $R^1$ to $R^4$ can be $C_1$-$C_2$ perfluoroalkyl or $C_1$-$C_2$ perfluoroalkoxy.

At least three of $R^1$ to $R^4$ can be fluorine atoms, and the other group in $R^1$ to $R^4$ can be $C_1$-$C_2$ perfluoroalkyl.

$R^1$ to $R^4$ can be all fluorine atoms.

Unit (1) can be a monomer unit represented by the following formula (1-1) (this unit may be referred to as "unit (1-1)" in the present specification).

(1-1)

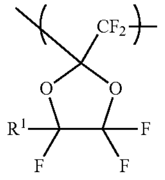

In the formula, $R^1$ is a fluorine atom, a fluoroalkyl group, or a fluoroalkoxy group.

Unit (1-1) as a monomer unit constituting the fluoropolymer may be used singly or in a combination of two or more.

In unit (1-1), $R^1$ can be fluorine, linear or branched $C_1$-$C_5$ fluoroalkyl, or linear or branched $C_1$-$C_5$ fluoroalkoxy.

In unit (1-1), $R^1$ can be fluorine, linear or branched $C_1$-$C_5$ perfluoroalkyl, or linear or branched $C_1$-$C_5$ perfluoroalkoxy.

In unit (1-1), $R^1$ can be fluorine, linear or branched $C_1$-$C_4$ fluoroalkyl, or linear or branched $C_1$-$C_4$ fluoroalkoxy.

In unit (1-1), $R^1$ can be fluorine, linear or branched $C_1$-$C_4$ perfluoroalkyl, or linear or branched $C_1$-$C_4$ perfluoroalkoxy.

In unit (1-1), $R^1$ can be fluorine, linear or branched $C_1$-$C_3$ fluoroalkyl, or linear or branched $C_1$-$C_3$ fluoroalkoxy.

In unit (1-1), $R^1$ can be fluorine, linear or branched $C_1$-$C_3$ perfluoroalkyl, or linear or branched $C_1$-$C_3$ perfluoroalkoxy.

In unit (1-1), $R^1$ can be fluorine, $C_1$-$C_2$ fluoroalkyl, or $C_1$-$C_2$ fluoroalkoxy.

In unit (1-1), $R^1$ can be fluorine, $C_1$-$C_2$ perfluoroalkyl, or $C_1$-$C_2$ perfluoroalkoxy.

In unit (1-1), $R^1$ can be fluorine, trifluoromethyl, pentafluoroethyl, or trifluoromethoxy.

In unit (1-1), $R^1$ can be $C_1$-$C_2$ perfluoroalkyl or $C_1$-$C_2$ perfluoroalkoxy.

In unit (1-1), $R^1$ can be $C_1$-$C_2$ perfluoroalkyl.

Preferred examples of unit (1-1) include a monomer unit represented by the following formula (1-11) (this monomer unit may be referred to as "unit (1-11)" in the present specification).

(1-11)

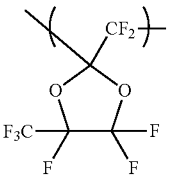

The fluoropolymer may comprise a fluoroolefin unit in addition to unit (1).

The fluoroolefin unit may be used singly or in a combination of two or more.

The percentage of the fluoroolefin unit can be 50 mol % or less, preferably 30 mol % or less, more preferably 20 mol % or less, even more preferably 10 mol % or less, and particularly preferably 0 mol %, based on the total monomer units.

The fluoroolefin unit is a monomer unit that is formed after polymerization of a monomer containing fluorine and a carbon-carbon double bond.

The atoms constituting the fluoroolefin unit may be only fluorine, halogen other than fluorine, carbon, hydrogen, and oxygen.

The atoms constituting the fluoroolefin unit may be only fluorine, halogen other than fluorine, carbon, and hydrogen.

The atoms constituting the fluoroolefin unit may be only fluorine, carbon, and hydrogen.

The atoms constituting the fluoroolefin unit may be only fluorine and carbon.

The fluoroolefin unit includes at least one unit selected from the group consisting of a fluorine-containing perhaloolefin unit, a vinylidene fluoride unit ($—CH_2—CF_2—$), a trifluoroethylene unit ($—CFH—CF_2—$), a pentafluoropropylene unit ($—CFH—CF(CF_3)—$, $—CF_2—CF(CHF_2)—$), a 1,1,1,2-tetrafluoro-2-propylene unit ($—CH_2—CF(CF_3)—$), and the like.

The fluorine-containing perhaloolefin unit is a monomer unit that is formed after polymerization of a monomer containing fluorine and a carbon-carbon double bond, and optionally halogen other than fluorine.

The fluorine-containing perhaloolefin unit includes at least one member selected from the group consisting of a chlorotrifluoroethylene unit ($—CFCl—CF_2—$), a tetrafluoroethylene unit ($—CF_2—CF_2—$), a hexafluoropropylene unit ($—CF_2—CF(CF_3)—$), a perfluoro(methyl vinyl ether) unit ($—CF_2—CF(OCF_3)—$), a perfluoro(ethyl vinyl ether) unit ($—CF_2—CF(OC_2F_5)—$), perfluoro (propyl vinyl ether) unit ($—CF_2—CF(OCF_2C_2F_5)—$), perfluoro(butyl vinyl ether) unit ($—CF_2—CF(O(CF_2)_2C_2F_5)—$), and a perfluoro (2,2-dimethyl-1,3-dioxol) unit (—CF-CAF— (wherein A represents a perfluorodioxolane ring formed with the adjacent carbon atom shown in the formula, with two trifluoromethyl bonded to the carbon atom at position 2 of the dioxolane ring).

The fluoroolefin unit includes at least one member selected from the group consisting of a chlorotrifluoroethylene unit, a tetrafluoroethylene unit, a hexafluoropropylene unit, a perfluoro(methyl vinyl ether) unit, and a perfluoro (propyl vinyl ether) unit.

The fluoropolymer may further contain one or more other monomer units in addition to unit (1) and the fluoroolefin unit. However, it is preferable to contain no other monomer units.

The other monomer units include $CH_2{=}CHRf$ (wherein Rf represents a $C_1$-$C_{10}$ fluoroalkyl group) units, alkyl vinyl ether units (e.g., a cyclohexyl vinyl ether unit, ethyl vinyl ether unit, butyl vinyl ether unit, and methyl vinyl ether unit), alkenyl vinyl ether units (e.g., a polyoxyethylene allyl ether unit and ethyl allyl ether unit), organosilicon compound units having a reactive $\alpha,\beta$-unsaturated group (e.g., a vinyltrimethoxysilane unit, vinyltriethoxysilane unit, and a vinyltris(methoxyethoxy)silane unit), acrylic ester units (e.g., a methyl acrylate unit and ethyl acrylate unit), methacrylic ester units (e.g., a methyl methacrylate unit and ethyl methacrylate unit), vinyl ester units (e.g., a vinyl acetate unit, vinyl benzoate unit, and a VeoVA (vinyl ester produced by Shell plc) unit), and the like.

The percentage of the other monomer units may be, for example, 0 mol % or more and 20 mol % or less, or 0 mol % or more and 10 mol % or less, based on the total monomer units.

The fluoropolymer preferably has a glass transition temperature (Tg) of 110° C. or higher, more preferably 110° C. or higher and 300° C. or lower, even more preferably 120° C. or higher and 300° C. or lower, and particularly preferably 125° C. or higher and 200° C. or lower. A glass transition temperature within these ranges is advantageous in terms of suppressing the occurrence of cracks and suppressing coloring of the resin.

In particular, in ultraviolet light-emitting elements, the energy conversion efficiency is low, and most of the supplied electric power is used for heat generation of the elements, rather than for light emission; thus, the temperatures of the elements and the encapsulation resin tend to rise. Since a rise in the temperature of a light-emitting element decreases light emission efficiency, it is common to control the amount of supplied current so that the temperature of the light-emitting element is not higher than a certain temperature. The control temperature is called the junction temperature, and is set to about 100° C. or higher and 110° C. or lower to control the amount of supplied current. A Tg of the encapsulation resin itself lower than the junction temperature is not preferable because it may cause, for example, coloring or cracking during use for a long period of time. When the glass transition temperature of the fluoropolymer is 110° C. or higher, such a phenomenon can be easily suppressed.

The fluoropolymer has a mass average molecular weight of, for example, 10,000 or more and 1,000,000 or less, preferably 30,000 or more and 500,000 or less, and more preferably 50,000 or more and 300,000 or less. A molecular weight within these ranges is advantageous in terms of durability.

Since the fluoropolymer has high permeability, the fluoropolymer can be used as an encapsulation resin for encapsulation of light-emitting elements. The fluoropolymer can have a total light transmittance of, for example, 90% or more and 99% or less, preferably 92% or more and 99% or less, and more preferably 94% or more and 99% or less.

Since the fluoropolymer also has high ultraviolet transmittance, the fluoropolymer can also be used as an encapsulation resin for encapsulation of ultraviolet light-emitting elements. The transmittance of the fluoropolymer at 193 nm or more and 410 nm or less can be, for example, 60% or more, and preferably 70% or more.

The fluoropolymer has a high indentation hardness. The fluoropolymer has an indentation hardness of, for example, 250 $N/mm^2$ or more and 1000 $N/mm^2$ or less, preferably 300 $N/mm^2$ or more and 800 $N/mm^2$ or less, and more preferably 350 $N/mm^2$ or more and 600 $N/mm^2$ or less.

The fluoropolymer can have an indentation elastic modulus of, for example, 2.5 GPa or more and 10 GPa or less, preferably 2.5 GPa or more and 8 GPa or less, and more preferably 2.5 GPa or more and 6 GPa or less.

A fluoropolymer can be produced, for example, by polymerizing one or more monomers corresponding to one or more monomer units constituting the fluoropolymer by an appropriate polymerization method. For example, a fluoropolymer can be produced by polymerizing one or more monomers corresponding to unit (1).

A fluoropolymer can also be produced by polymerizing one or more monomers corresponding to unit (1), optionally with at least one monomer selected from the group consisting of fluoroolefins and other monomers.

A person skilled in the art would be able to understand monomers corresponding to the monomer units constituting a fluoropolymer. For example, a monomer corresponding to unit (1) is a compound represented by formula (M1):

(M1)

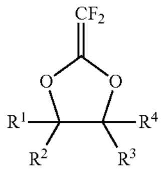

wherein $R^1$ to $R^4$ are as defined above (this compound may be referred to as "monomer (M1)" in the present specification).

For example, a monomer corresponding to unit (1-1) is a compound represented by formula (M1-1):

(M1-1)

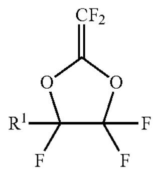

wherein $R^1$ is a fluorine atom, a fluoroalkyl group, or a fluoroalkoxy group (this compound may be referred to as "monomer (M1-1)" in the present specification).

For example, the monomer corresponding to unit (1-11) is a compound represented by formula (M1-11):

(M1-11)

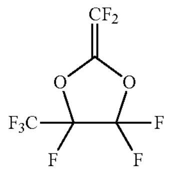

(this compound may be referred to as "monomer (M1-11)" in the present specification).

The fluoroolefins for use may be monomers corresponding to the fluoroolefin units mentioned above. For example, the monomers corresponding to the tetrafluoroethylene unit, hexafluoropropylene unit, and vinylidene fluoride unit are tetrafluoroethylene ($CF_2{=}CF_2$), hexafluoropropylene ($CF_3CF{=}CF_2$), and vinylidene fluoride ($CH_2{=}CF_2$), respectively. Thus, the details regarding fluoroolefins would be able to be understood by a person skilled in the art from the description of the corresponding fluoroolefin units.

For example, the fluoroolefin may be at least one member selected from the group consisting of fluorine-containing perhaloolefins, vinylidene fluoride, trifluoroethylene, pentafluoropropylene, and 1,1,1,2-tetrafluoro-2-propylene. Preferably, the fluoroolefin may be at least one member selected from the group consisting of chlorotrifluoroethylene, tetrafluoroethylene, hexafluoropropylene, perfluoro(methyl vinyl ether), and perfluoro(propyl vinyl ether).

The fluorine-containing perhaloolefin may be at least one member selected from the group consisting of chlorotrifluoroethylene, tetrafluoroethylene, hexafluoropropylene, perfluoro(methyl vinyl ether), perfluoro(ethyl vinyl ether), perfluoro(propyl vinyl ether), perfluoro(butyl vinyl ether), and perfluoro(2,2-dimethyl-1,3-dioxol).

The other monomers for use may be monomers corresponding to the other monomer units mentioned above. Thus, the details regarding the other monomers would be able to be understood by a person skilled in the art from the description of the corresponding other monomer units.

The polymerization method includes, for example, a method of using appropriate amounts of monomers corresponding to the monomer units that constitute the fluoropolymer, with the monomers being optionally dissolved or dispersed in a solvent (e.g., an aprotic solvent) and a polymerization initiator being optionally added, and performing polymerization (e.g., radical polymerization, bulk polymerization, solution polymerization, suspension polymerization, dispersion polymerization, or emulsion polymerization).

The polymerization method is preferably solution polymerization because solution polymerization can produce a high-concentration solution of the fluoropolymer and thereby achieve a high manufacturing yield, and is advantageous for the formation of a thick film and purification. Therefore, the fluoropolymer is preferably produced by solution polymerization. The fluoropolymer is more preferably produced by solution polymerization in which one or more monomers are polymerized in the presence of an aprotic solvent.

The solvent for use in solution polymerization of the fluoropolymer is preferably an aprotic solvent. The amount of aprotic solvent for use in the production of the fluoropolymer is, for example, 80 mass % or less, less than 80 mass %, 75 mass % or less, 70 mass % or less, 35 mass % or more and 95 mass % or less, 35 mass % or more and 90 mass % or less, 35 mass % or more and 80 mass % or less, 35 mass % or more and 70 mass % or less, 35 mass % or more and less than 70 mass %, or 60 mass % or more and 80 mass % or less, based on the sum of the mass of the monomers and the mass of the solvent. The amount can be preferably 35 mass % or more and less than 80 mass %, more preferably 40 mass % or more and 75 mass % or less, and particularly preferably 50 mass % or more and 70 mass % or less.

The aprotic solvent for use in the polymerization of fluoropolymers can be, for example, at least one member selected from the group consisting of perfluoroaromatic compounds, perfluorotrialkylamines, perfluoroalkanes, hydrofluorocarbons, perfluorocyclic ethers, hydrofluoroethers, and olefin compounds containing at least one chlorine atom.

The perfluoroaromatic compound is, for example, a perfluoroaromatic compound optionally having one or more perfluoroalkyl groups. The aromatic ring of the perfluoroaromatic compound can be at least one ring selected from the group consisting of a benzene ring, a naphthalene ring, and an anthracene ring. The perfluoroaromatic compound can have one or more (e.g., one, two, or three) aromatic rings.

The perfluoroalkyl group as a substituent is, for example, linear or branched, $C_1$-$C_6$, $C_1$-$C_5$, or $C_1$-$C_4$ perfluoroalkyl, and preferably linear or branched $C_1$-$C_3$ perfluoroalkyl.

The number of substituents is, for example, one to four, preferably one to three, and more preferably one or two. When a plurality of substituents are present, the substituents may be the same or different.

Examples of perfluoroaromatic compounds include perfluorobenzene, perfluorotoluene, perfluoroxylene, and perfluoronaphthalene.

Preferred examples of perfluoroaromatic compounds include perfluorobenzene and perfluorotoluene.

The perfluorotrialkylamine is, for example, an amine substituted with three linear or branched perfluoroalkyl groups. The number of carbon atoms of each perfluoroalkyl group is, for example, 1 to 10, preferably 1 to 5, and more preferably 1 to 4. The perfluoroalkyl groups can be the same or different, and are preferably the same.

Examples of perfluorotrialkylamines include perfluorotrimethylamine, perfluorotriethylamine, perfluorotripropylamine, perfluorotriisopropylamine, perfluorotributylamine, perfluorotri-sec-butylamine, perfluorotri-tert-butylamine, perfluorotripentylamine, perfluorotriisopentylamine, and perfluorotrineopentylamine.

Preferred examples of perfluorotrialkylamines include perfluorotripropylamine and perfluorotributylamine.

The perfluoroalkane is, for example, a linear, branched, or cyclic $C_3$-$C_{12}$ (preferably $C_3$-$C_{10}$, more preferably $C_3$-$C_6$) perfluoroalkane.

Examples of perfluoroalkanes include perfluoropentane, perfluoro-2-methylpentane, perfluorohexane, perfluoro-2-methylhexane, perfluoroheptane, perfluorooctane, perfluorononane, perfluorodecane, perfluorocyclohexane, perfluoro(methylcyclohexane), perfluoro(dimethylcyclohexane) (e.g., perfluoro(1,3-dimethylcyclohexane)), and perfluorodecalin.

Preferred examples of perfluoroalkanes include perfluoropentane, perfluorohexane, perfluoroheptane, and perfluorooctane.

The hydrofluorocarbon is, for example, a $C_3$-$C_8$ hydrofluorocarbon. Examples of hydrofluorocarbons include $CF_3CH_2CF_2H$, $CF_3CH_2CF_2CH_3$, $CF_3CHFCHFC_2F_5$, 1,1,2,2,3,3,4-heptafluorocyclopentane, $CF_3CF_2CF_2CF_2CH_2CH_3$, $CF_3CF_2CF_2CF_2CF_2CHF_2$, and $CF_3CF_2CF_2CF_2CF_2CF_2CH_2CH_3$.

Preferred examples of hydrofluorocarbons include $CF_3CH_2CF_2H$ and $CF_3CH_2CF_2CH_3$.

The perfluorocyclic ether is, for example, a perfluorocyclic ether optionally having one or more perfluoroalkyl groups. The ring of the perfluorocyclic ether may be a 3- to 6-membered ring. The ring of the perfluorocyclic ether may have one or more oxygen atoms as a ring-constituting atom. The ring preferably has one or two oxygen atoms, and more preferably one oxygen atom.

The perfluoroalkyl group as a substituent is, for example, linear or branched $C_1$-$C_6$, $C_1$-$C_5$, or $C_1$-$C_4$ perfluoroalkyl. The perfluoroalkyl group is preferably linear or branched $C_1$-$C_3$ perfluoroalkyl.

The number of substituents is, for example, one to four, preferably one to three, and more preferably one or two. When a plurality of substituents are present, they may be the same or different.

Examples of perfluorocyclic ethers include perfluorotetrahydrofuran, perfluoro-5-methyltetrahydrofuran, perfluoro-5-ethyltetrahydrofuran, perfluoro-5-propyltetrahydrofuran, perfluoro-5-butyltetrahydrofuran, and perfluorotetrahydropyran.

Preferred examples of perfluorocyclic ethers include perfluoro-5-ethyltetrahydrofuran and perfluoro-5-butyltetrahydrofuran.

The hydrofluoroether is, for example, a fluorine-containing ether.

The hydrofluoroether preferably has a global warming potential (GWP) of 400 or less, and more preferably 300 or less.

Examples of hydrofluoroethers include $CF_3CF_2CF_2CF_2OCH_3$, $CF_3CF_2CF(CF_3)OCH_3$, $CF_3CF(CF_3)CF_2OCH_3$, $CF_3CF_2CF_2CF_2OC_2H_5$, $CF_3CH_2OCF_2CHF_2$, $C_2F_5CF(OCH_3)C_3F_7$, $(CF_3)_2CHOCH_3$, $(CF_3)_2CFOCH_3$, $CHF_2CF_2OCH_2CF_3$, $CHF_2CF_2CH_2OCF_2CHF_2$, $CF_3CHFCF_2OCH_3$, $CF_3CHFCF_2OCF_3$, trifluoromethyl 1,2,2,2-tetrafluoroethyl ether (HFE-227me), difluoromethyl 1,1,2,2,2-pentafluoroethyl ether (HFE-227mc), trifluoromethyl 1,1,2,2-tetrafluoroethyl ether (HFE-227pc), difluoromethyl 2,2,2-trifluoroethyl ether (HFE-245mf), 2,2-difluoroethyltrifluoromethyl ether (HFE-245pf), 1,1,2,3,3,3-hexafluoropropylmethyl ether ($CF_3CHFCF_2$ $OCH_3$), 1,1,2,2-tetrafluoroethyl 2,2,2-trifluoroethyl ether ($CHF_2CF_2OCH_2CF_3$), and 1,1,1,3,3,3-hexafluoro-2-methoxypropane ($(CF_3)_2CHOCH_3$).

Preferred examples of hydrofluoroethers include $CF_3CF_2CF_2CF_2OCH_3$, $CF_3CF_2CF_2CF_2OC_2H_5$, $CF_3CH_2OCF_2CHF_2$, and $C_2F_5CF(OCH_3)C_3F_7$.

The hydrofluoroether is preferably a compound represented by the following formula (B1):

$$R^{21}—O—R^{22} \quad (B1),$$

wherein $R^{21}$ is linear or branched perfluorobutyl and $R^{22}$ is methyl or ethyl.

The olefin compound containing at least one chlorine atom is a $C_2$-$C_4$ (preferably $C_2$-$C_3$) olefin compound containing at least one chlorine atom in its structure. The olefin compound containing at least one chlorine atom is a compound in which at least one of the hydrogen atoms bonded to the carbon atoms in a $C_2$-$C_4$ hydrocarbon having one or two (preferably one) carbon-carbon double bonds (C═C) is replaced with chlorine. A compound in which at least one of the hydrogen atoms bonded to two carbon atoms constituting the carbon-carbon double bond in a $C_2$-$C_4$ hydrocarbon is replaced with chlorine is preferred.

The number of chlorine atoms is one to the maximum substitutable number. The number of chlorine atoms may be, for example, one, two, three, four, or five.

The olefin compound containing at least one chlorine atom may contain at least one (e.g., one, two, three, four, or five) fluorine atom.

Examples of olefin compounds containing at least one chlorine atom include $CH_2$═CHCl, CHCl═CHCl, $CCl_2$═CHCl, $CCl_2$═$CCl_2$, $CF_3CH$═CHCl, $CHF_2CF$═CHCl, $CFH_2CF$═CHCl, $CF_3CCl$═CFCl, $CF_2HCl$═CFCl, and $CFH_2Cl$═CFCl.

Preferred examples of olefin compounds containing at least one chlorine atom include CHCl═CHCl, $CHF_2CF$═CHCl, $CF_3CH$═CHCl, and $CF_3CCl$═CFCl.

As the aprotic solvent, a hydrofluoroether is preferable because it has less environmental impact during use and polymers can be dissolved at high concentrations in it.

Preferred examples of polymerization initiators used in production of the fluoropolymer include di-n-propyl peroxydicarbonate, diisopropyl peroxydicarbonate, diisobutyryl peroxide, di(w-hydro-dodecafluoroheptanoyl)peroxide, di(w-hydro-hexadecafluorononanoyl)peroxide, w-hydro-dodecafluoroheptanoyl-w-hydro-hexadecafluorononanoyl-peroxide, benzoyl peroxide, tert-butyl peroxypivalate, tert-hexyl peroxypivalate, ammonium persulfate, sodium persulfate, and potassium persulfate.

Particularly preferred examples of polymerization initiators include di-n-propyl peroxydicarbonate, diisopropyl peroxydicarbonate, diisobutyryl peroxide, di(w-hydro-dodecafluoroheptanoyl)peroxide, benzoyl peroxide, tert-butyl peroxypivalate, tert-hexyl peroxypivalate, and ammonium persulfate.

The amount of the polymerization initiator for use in the polymerization reaction can be, for example, 0.0001 g or more and 0.05 g or less, preferably 0.0001 g or more and 0.01 g or less, and more preferably 0.0005 g or more and 0.008 g or less, per gram of all of the monomers subjected to the reaction.

The temperature of the polymerization reaction can be, for example, −10° C. or higher and 160° C. or lower, preferably 0° C. or higher and 160° C. or lower, and more preferably 0° C. or higher and 100° C. or lower.

The reaction time for the polymerization reaction is preferably 0.5 hours or more and 72 hours or less, more preferably 1 hour or more and 48 hours or less, and even more preferably 3 hours or more and 30 hours or less.

The polymerization reaction can be performed in the presence or absence of an inert gas (e.g., nitrogen gas), and preferably in the presence of an inert gas.

The polymerization reaction can be performed under reduced pressure, atmospheric pressure, or increased pressure.

The polymerization reaction can be performed by adding one or more monomers to an aprotic solvent containing a polymerization initiator and subjecting it to polymerization conditions. The polymerization reaction can also be performed by adding a polymerization initiator to an aprotic solvent containing one or more monomers and subjecting it to polymerization conditions.

The fluoropolymer produced by the polymerization reaction may be purified, if desired, by a conventional method, such as extraction, dissolution, concentration, filtration, precipitation, reprecipitation, dehydration, adsorption, or chromatography, or a combination of these methods. Alternatively, a solution of the fluoropolymer produced by the polymerization reaction, a dilute solution thereof, or a mixture of the solution with other optional components or the like may be dried or heated (e.g., 30° C. or higher and 150° C. or lower) to form an encapsulation resin containing the fluoropolymer.

The content of the fluoropolymer in the encapsulation resin can be, for example, 50 mass % or more and 100 mass % or less, preferably 60 mass % or more and 100 mass % or less, more preferably 80 mass % or more and 100 mass % or less, and particularly preferably 90 mass % or more and 100 mass % or less, based on the total mass of the encapsulation resin.

The encapsulation resin may comprise other components in addition to the fluoropolymer. Such other components may be known components in encapsulation resins, such as colorants, light-diffusing agents, fillers, plasticizers, viscosity modifiers, flexibilizers, light-resistant stabilizers, reaction inhibitors, and adhesion promoters.

The encapsulation resin may comprise other components in appropriate amounts as long as the effects of the present disclosure are obtained. The content of the other components can be, for example, 0 mass % or more and 50 mass % or less, preferably 0 mass % or more and 40 mass % or less, more preferably 0 mass % or more and 20 mass % or less, and particularly preferably 0 mass % or more and 10 mass % or less, based on the total mass of the encapsulation resin.

The filler is preferably one that transmits ultraviolet light. Examples include calcium fluoride, sapphire, silicon dioxide, optical glass, and the like. These fillers may be used singly or in a combination of two or more. The particle size and shape of the filler are not limited, and particles having various particle shapes such as shapes of a sphere, a needle, and a plate can be used. Addition of a filler has the advantage of improving moldability when forming the encapsulation resin from the encapsulation resin composition and making it easy to form the resin in various shapes.

The encapsulation resin is preferable as a resin for encapsulation of light-emitting elements. Examples of light-emitting elements include known light-emitting elements. Since the encapsulation resin of the present disclosure has the effect of suppressing the occurrence of cracks in ultraviolet light emission, the light-emitting elements are preferably ultraviolet light-emitting elements. Preferred examples of ultraviolet light-emitting element include ultraviolet light-emitting diodes (LEDs) Ultraviolet light-emitting elements are elements that mainly emit ultraviolet light, for example, light with a wavelength of 100 nm or more and 400 nm or less. UV-A (315 nm or more and 380 nm or less) is used for, for example, curing resins, UV-B (280 nm or more and 315 nm or less) is used for, for example, sterilization and disinfection, and UV-C (200 nm or more and 280 nm or less) is used for, for example, exposure of printed-circuit boards. Ultraviolet light-emitting elements corresponding to each wavelength are required. The encapsulation resin can be used for any wavelength light-emitting elements.

The thickness of the encapsulation resin is not limited as long as the encapsulation resin has a thickness required for encapsulating light-emitting elements. The average film thickness may be, for example, 10 nm or more, or 50 nm or more and 10 cm or less, preferably 100 nm or more and 5 cm or less, more preferably 1 μm or more and 1 cm or less, even more preferably 10 μm or more and 500 μm or less, and particularly preferably 10 μm or more and 300 μm or less. When the average film thickness is within the above ranges, it is advantageous in terms of durability.

The encapsulation resin can be produced, for example, by drying or heating a liquid obtained by dissolving or dispersing the fluoropolymer in a solvent to thus remove the solvent from the liquid. Preferably, the encapsulation resin can be produced by removing the solvent from the resin composition for forming an encapsulation resin of the present disclosure described below.

Light-Emitting Element Package

The present disclosure can include a light-emitting element package. The light-emitting element package is not limited as long as it comprises the encapsulation resin of the present disclosure. The light-emitting element package can include flip-chip-type light-emitting element packages.

The light-emitting element package can include, for example, the encapsulation resin of the present disclosure, a light-emitting element, a substrate comprising a light-emitting element (light-emitting element chip), and a dam. Suitable light-emitting elements in the light-emitting element package are ultraviolet light-emitting elements. Preferred examples of ultraviolet light-emitting elements include ultraviolet light-emitting diodes (LEDs). Ultraviolet light-emitting elements are elements that mainly emit ultraviolet light, for example, light with a wavelength of 100 nm or more and 400 nm or less. Examples of the wavelengths thereof include those of UV-A, UV-B, UV-C, and the like, which have high industrial value.

Known production methods can be applied to the production of the light-emitting element package. For example, the light-emitting element package can be produced by using the resin composition of the present disclosure in place of a resin composition for encapsulation resins used in a known method for producing light-emitting element packages.

Resin Composition

The resin composition according to one embodiment of the present disclosure is a liquid resin composition for forming encapsulation resins. The resin composition can comprise a fluoropolymer and an aprotic solvent.

The fluoropolymer in the resin composition may be the fluoropolymer described above for the encapsulation resin. Therefore, the details of the fluoropolymer for the encapsulation resin are applicable to the details of the fluoropolymer for the resin composition.

The content of the fluoropolymer in the resin composition can be, for example, 5 mass % or more and 65 mass % or less, 10 mass % or more and 65 mass % or less, 20 mass % or more and 65 mass % or less, 30 mass % or more and 65 mass % or less, more than 30 mass % and 65 mass % or less, or 20 mass % or more and 40 mass % or less, based on the total mass of the resin composition. The content is preferably more than 20 mass % and 65 mass % or less, more preferably 25 mass % or more and 60 mass % or less, and particularly preferably 30 mass % or more and 50 mass % or less.

The aprotic solvent in the resin composition may be the aprotic solvent described above for the encapsulation resin. Therefore, the details of the aprotic solvent for the encapsulation resin are applicable to the details of the aprotic solvent for the resin composition.

The content of the aprotic solvent in the resin composition can be, for example, 35 mass % or more and 95 mass % or less, 35 mass % or more and 90 mass % or less, 35 mass % or more and 80 mass % or less, 35 mass % or more and 70 mass % or less, 35 mass % or more and less than 70 mass %, or 60 mass % or more and 80 mass % or less, based on the total mass of the resin composition. The content is preferably 35 mass % or more and less than 80 mass %, more preferably 40 mass % or more and 75 mass % or less, and particularly preferably 50 mass % or more and 70 mass % or less.

The resin composition may comprise a polymerization initiator. The polymerization initiator for the resin composition may be the polymerization initiator described above for the encapsulation resin. Therefore, the details of the polymerization initiator for the encapsulation resin are applicable to the details of the polymerization initiator for the resin composition.

The content of the polymerization initiator in the resin composition is, for example, 0.00001 mass % or more and 10 mass % or less, preferably 0.00005 mass % or more and 10 mass % or less, and more preferably 0.0001 mass % or more and 10 mass % or less, based on the total mass of the resin composition.

The resin composition may comprise the fluoropolymer and an aprotic solvent, and optionally a polymerization initiator and optionally other components. Examples of other components can include known components in resin compositions for encapsulation, such as colorants, light-diffusing agents, fillers, plasticizers, viscosity modifiers, flexibilizers, light-resistant stabilizers, reaction inhibitors, and adhesion promoters.

The resin composition may comprise other components in appropriate amounts as long as the effects of the present disclosure are obtained. The content of the other components can be, for example, 0.01 mass % or more and 99 mass % or less, preferably 0.01 mass % or more and 50 mass % or less, more preferably 0.01 mass % or more and 30 mass % or less, and particularly preferably 10 mass % or more and 20 mass % or less, based on the total mass of the resin composition.

For other matters regarding the other components, the description in the "Encapsulation Resin for Light-Emitting Elements" section applies.

The resin composition can be produced by mixing the fluoropolymer and an aprotic solvent, optionally with a polymerization initiator and optionally with other components.

The resin composition can be produced by mixing a polymerization reaction mixture obtained by the solution polymerization of fluoropolymer described above (this reaction mixture contains at least a fluoropolymer and an aprotic solvent) optionally with an aprotic solvent and/or other components.

When solution polymerization is performed, the fluoropolymer concentration or the amount of fluoropolymer dissolved in the polymerization reaction mixture can be increased, and the step of isolating the fluoropolymer from the polymerization reaction mixture can be omitted. For this reason, the resin composition preferably contains a polymerization reaction mixture.

In the resin composition, the content of the polymerization reaction mixture of solution polymerization can be appropriately selected according to the concentration of the fluoropolymer in the polymerization reaction mixture and the functions, thickness, etc. of the encapsulation resin to be produced. The content of the polymerization reaction mixture of solution polymerization in the resin composition can be, for example, 5 mass % or more and 100 mass % or less, preferably 20 mass % or more and 100 mass % or less, and more preferably 30 mass % or more and 100 mass % or less, based on the total mass of the resin composition.

The resin composition can be placed in a predetermined portion of the light-emitting element package, and then the solvent can be removed by drying, heating, vacuum drying, or the like to form an encapsulation resin, thereby protecting the light-emitting element. The drying or heating temperature is, for example, 30° C. or higher and 150° C. or lower, and preferably 30° C. or higher and 80° C. or lower.

For example, the resin composition can be applied to a substrate on which a light-emitting element is mounted, and then dried in a dryer at 80° C. The thickness can be adjusted to a desired thickness by repeating the application and drying. Since the resin composition can have an extremely high fluoropolymer concentration, an encapsulation resin layer can be formed much more easily than a process for forming a film from dilute solutions of other less-soluble fluoropolymers.

The present disclosure includes the following embodiments.

Item 1.

An encapsulation resin for light-emitting elements, comprising a fluoropolymer, wherein the fluoropolymer comprises, as a main component, a monomer unit represented by formula (1):

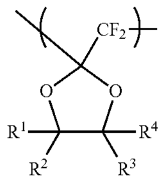

(1)

wherein $R^1$ to $R^4$ are each independently a fluorine atom, a fluoroalkyl group, or a fluoroalkoxy group.

Item 2.

The encapsulation resin according to Item 1, wherein the fluoropolymer further comprises a fluoroolefin unit.

Item 3.

The encapsulation resin according to Item 2, wherein the fluoroolefin unit is at least one member selected from the group consisting of a fluorine-containing perhaloolefin unit, a vinylidene fluoride unit, a trifluoroethylene unit, a pentafluoropropylene unit, and a 1,1,1,2-tetrafluoro-2-propylene unit.

Item 4.

The encapsulation resin according to Item 3, wherein the fluorine-containing perhaloolefin unit is at least one member selected from the group consisting of a chlorotrifluoroethylene unit, a tetrafluoroethylene unit, a hexafluoropropylene unit, a perfluoro(methyl vinyl ether) unit, a perfluoro(ethyl vinyl ether) unit, a perfluoro(propyl vinyl ether) unit, a perfluoro(butyl vinyl ether) unit, and a perfluoro(2,2-dimethyl-1,3-dioxol) unit.

Item 5.

The encapsulation resin according to Item 2, wherein the fluoroolefin unit is at least one member selected from the group consisting of a chlorotrifluoroethylene unit, a tetrafluoroethylene unit, a hexafluoropropylene unit, a perfluoro(methyl vinyl ether) unit, and a perfluoro(propyl vinyl ether) unit.

Item 6.

The encapsulation resin according to any one of Items 1 to 5, wherein the fluoropolymer has an indentation hardness of 250 $N/mm^2$ or more and 1000 $N/mm^2$ or less.

Item 7.

The encapsulation resin according to any one of Items 1 to 6, wherein the fluoropolymer has an indentation elastic modulus of 2.5 GPa or more and 10 GPa or less.

Item 8.

The encapsulation resin according to any one of Items 1 to 7, wherein the fluoropolymer has a total light transmittance of 90% or more.

Item 9.

The encapsulation resin according to any one of Items 1 to 8, wherein the fluoropolymer has a transmittance of 60% or more at 193 nm or more and 410 nm or less.

Item 10.

The encapsulation resin according to any one of Items 1 to 9, wherein the fluoropolymer has a glass transition temperature of 110° C. or higher.

Item 11.

The encapsulation resin according to any one of Items 1 to 10, which is for ultraviolet-light-emitting elements.

Item 12.

A light-emitting element package comprising the encapsulation resin according to any one of Items 1 to 11.

Item 13.

A resin composition for forming the encapsulation resin according to any one of Items 1 to 11, the resin composition comprising a fluoropolymer and an aprotic solvent, wherein the fluoropolymer comprises, as a main component, a monomer unit represented by formula (1):

(1)

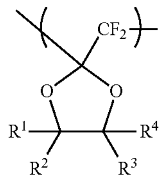

wherein $R^1$ to $R^4$ are each independently a fluorine atom, a fluoroalkyl group, or a fluoroalkoxy group.

Item 14.

The resin composition according to Item 13, wherein the content of the fluoropolymer is 20 mass % or more and 65 mass % or less based on the total mass of the resin composition.

Item 15.

The resin composition according to Item 13 or 14, wherein the aprotic solvent is at least one solvent selected from the group consisting of perfluoroaromatic compounds, perfluorotrialkylamines, perfluoroalkanes, hydrofluorocarbons, perfluorocyclic ethers, hydrofluoroethers, and olefin compounds containing at least one chlorine atom.

Item 16.

The resin composition according to any one of Items 13 to 15, wherein the aprotic solvent is at least one hydrofluoroether.

Although embodiments are described above, it can be understood that various modifications in form and details may be made without departing from the spirit and scope of the claims.

EXAMPLES

An embodiment of the present disclosure is described in more detail below with Examples; however, the present disclosure is not limited to these.

The symbols and abbreviations in the Examples are used with the following meanings.

Initiator solution (1): a methanol solution containing 50 mass % di-n-propyl peroxydicarbonate (10-hour half-life temperature: 40° C.)

Fluoropolymer (1-11): a polymer composed of unit (1-11)

Mw: mass average molecular weight

GPC Analysis Method (Measurement of Mass Average Molecular Weight of Fluoropolymer)

Sample Preparation Method

A polymer was dissolved in perfluorobenzene to prepare a 2 mass % polymer solution, and the polymer solution was passed through a membrane filter (0.22 μm) to obtain a sample solution.

Measurement Method

Standard sample for measurement of molecular weight: polymethyl methacrylate

Detection method: RI (differential refractometer)

Confirmation of Polymer Solubility

Whether the polymer was dissolved in the liquid was determined as follows.

Each of the prepared liquids was visually observed, and when no undissolved polymer was observed and the entire liquid flowed uniformly at room temperature, it was determined that the polymer was dissolved.

Average Film Thickness

The average film thickness was defined as the average value of a thickness measured 5 times with a micrometer. When measuring the thickness of a film itself was difficult, such as when a film formed on a base material of a substrate etc. could not be peeled off, the average film thickness was calculated by measuring the thickness of the base material before film formation and the thickness of the base material after film formation (the sum of the film thickness and the base material thickness) 5 times each with a micrometer, and subtracting the average value of the thickness before film formation from the average value of the thickness after film formation.

Indentation Hardness and Indentation Elastic Modulus

The indentation hardness ($H_{IT}$; indentation hardness) of the sample was measured using an ENT-2100 ultra-fine hardness tester produced by Nanotec Corporation. The indentation elastic modulus was also measured at the same time. The test was performed by adjusting the indentation depth to be 1/10 or less of the thickness.

Measurement Method for Total Light Transmittance and Haze

The total light transmittance and haze were measured using an NDH 7000SPII haze meter (produced by Nippon Denshoku Industries Co., Ltd.) in accordance with JIS K7136 (haze value) and JIS K7361-1 (total light transmittance). A film with an average film thickness of 100 μm was used as the sample to be measured. The sample was produced by coating a glass plate with a coating agent such that the thickness after drying was 100 μm, performing drying at 80° C. for 4 hours, and peeling off the resulting dried film with an average film thickness of 100 μm from the glass plate.

Transmittance at Each Wavelength

The transmittance at a specific wavelength of a sample (a film with an average film thickness of 100 μm) was measured using a Hitachi U-4100 spectrophotometer. An integrating sphere detector was used as the detector.

Refractive Index

The refractive index of a sample at 23° C. was measured with an Abbe refractive index meter (NAR-1T SOLID, produced by Atago Co., Ltd.). The wavelength was a wavelength approximate to D-line because of the use of the LED attached to the device.

Abbe Number

The Abbe number of a sample at 23° C. was measured with an Abbe refractive index meter (NAR-1T SOLID, produced by Atago Co., Ltd.).

Water Absorption (24° C.)

The weight of a sample that had been thoroughly dried beforehand was measured and set as W0. The sample was then completely immersed in water at 24° C. that was 100 times or greater than W0 by mass. The weight of the sample after 24 hours was measured and set as W24. The water absorption was determined from the following formula.

$$\text{Water absorption (\%)}=100\times(W24-W0)/W0$$

Water Absorption (60° C.)

The weight of a sample that had been thoroughly dried beforehand was measured and set as W0. The sample was then completely immersed in water at 60° C. that was 100 times or greater than W0 by mass. The weight of the sample after 24 hours was measured and set as W24. The water absorption was determined from the following formula.

$$\text{Water absorption (\%)}=100\times(W24-W0)/W0$$

Tensile Elastic Modulus

A sample (length: 30 mm, width: 5 mm, thickness: 0.1 mm) was measured with a DVA220 dynamic viscoelasticity measurement device produced by IT Measurement Control Co., Ltd., under the conditions of a tensile mode, a grip width of 20 mm, a measurement temperature of 25° C. to 150° C., a temperature-increasing rate of 2° C./min, and a frequency of 1 Hz. The elastic modulus value at 25° C. was defined as a tensile elastic modulus.

Tensile Strength

The tensile strength of a film was measured using an AGS-100NX autograph produced by Shimadzu Corporation. The sample was cut to a dumbbell shape 5B as stated in JIS K7162. The measurement was performed under the conditions of a chuck-to-chuck distance of 12 mm, a crosshead speed of 1 mm/min, and room temperature.

Thermal Decomposition Temperature

The temperatures at which the mass loss percentage of a sample became 0.1% and 5% were measured at a temperature-increasing rate of 10° C./minute in an air atmosphere using a thermogravimetric-differential thermal analyzer (Hitachi High-Tech Science Corporation; STA7200).

Glass Transition Temperature (Tg)

The temperature was increased (first run), decreased, and then increased (second run) at 10° C./minute in the temperature range of 30° C. or higher and 200° C. or lower using a DSC (differential scanning calorimeter; Hitachi High-Tech Science Corporation, DSC7000); the midpoint of the endothermic curve in the second run was determined to be the glass transition temperature (° C.).

Coefficient of Linear Expansion

A thermomechanical analyzer (TMA8310; produced by Rigaku Corporation) was set in a tensile mode with a chuck-to-chuck distance of 15 mm. A sample cut to a size of 5 mm in width and 20 mm in length was held with the chucks, and the temperature was increased from room temperature to 150° C. (1st up), decreased to room temperature, and then increased to 150° C. (2nd up) at 2° C./minute. The average coefficient of linear expansion at 25° C. or higher and 80° C. or lower in the 2nd up was determined and defined as the coefficient of linear expansion.

Preparation Example 1: Polymerization of Fluoropolymer Comprising Unit (1-11) as Main Component and Production of Polymer Solution (Polymerization Reaction Mixture)

The monomer (M1-11) (10 g), ethyl nonafluorobutyl ether (20 g) as a solvent, and the initiator solution (1) (0.041 g) were placed in a 50-mL glass container, and a polymerization reaction was then performed for 20 hours while the mixture was heated such that the internal temperature was 40° C., thereby producing a fluoropolymer (1-11) (9.0 g, Mw: 97533). The fluoropolymer in the polymerization reaction mixture was dissolved, and the concentration was 31 mass %.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 1

The polymerization reaction mixture obtained in Preparation Example 1 was directly used as a resin composition, and an encapsulation resin film was produced as follows.

A glass substrate was coated with the polymerization reaction mixture such that the thickness after drying was 100 μm, and heating was performed at 80° C. for 4 hours to form a transparent film. The film was then peeled off from the glass plate, thereby obtaining a fluoropolymer (1-11) film having an average film thickness of 100 μm.

The optical properties of the film were measured. The results are shown below. FIG. 1 shows the transmittance at each wavelength.

Total light transmittance: 96%
Haze: 0.34%
Transmittance (193 nm): 74.4%
Transmittance (550 nm): 94.6%
Refractive index: 1.335
Abbe number: 91

Further, the following items were also measured. The results are shown below.

Indentation hardness: 420 N/mm$^2$
Indentation elastic modulus: 3.3 GPa
Water absorption (24° C.): 0.00%
Water absorption (60° C.): 0.09%
Tensile elastic modulus: 3.1 GPa
Tensile strength: 20.9 MPa
Thermal decomposition temperature (0.1%): 294.5° C.
Thermal decomposition temperature (5%): 439.4° C.
Glass transition temperature: 129° C.

Coefficient of linear expansion: 80 ppm

The obtained film exhibited a high total light transmittance, a high transmittance at 193 nm, and a high transmittance at 550 nm, and thus had the permeability required for encapsulation resins. The obtained film exhibited a high indentation hardness and a high indentation elastic modulus, and thus had the hardness required for encapsulation resins. The obtained film had a glass transition temperature higher than the typical junction temperature (110° C.).

Example 2

Figure 2:
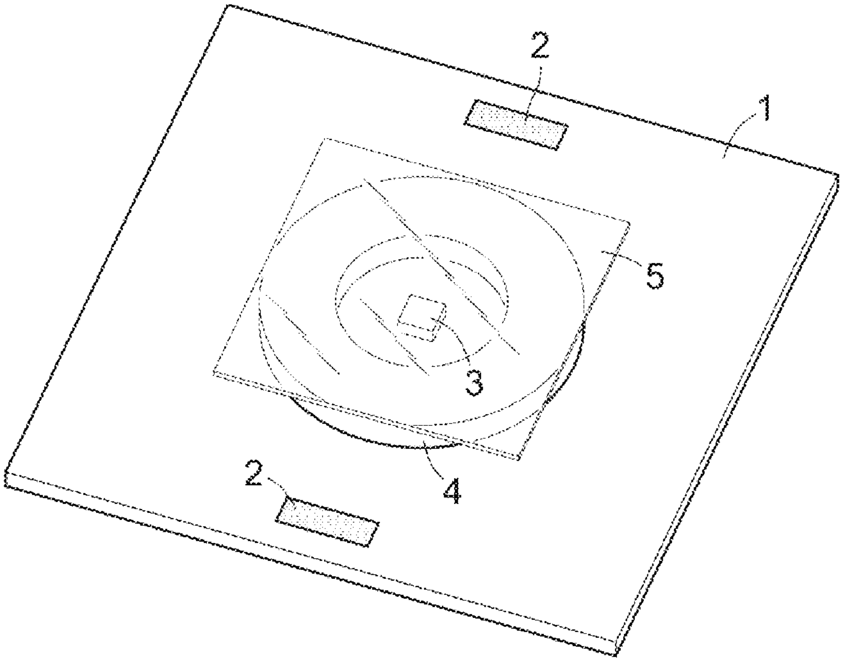
FIG. 2 is a schematic view of the test apparatus used for the light resistance test of Example 3.

A substrate on which a commercially available UV-LED chip was mounted (FIG. 2; however, without using a fluoropolymer film (5)) was surface-treated with 3-aminopropyltrimethoxysilane and then coated with the polymerization reaction mixture obtained in Preparation Example 1 such that the thickness was about 100 μm. Heating was then performed at 80° C. for 2 hours, thereby obtaining a UV-LED chip-mounted substrate encapsulated with a uniform, transparent fluoropolymer (1-11) resin. More specifically, the polymerization reaction mixture was dripped from just above the chip with a dropper and air-dried. The dripping and air drying were repeated to coat the chip to a predetermined thickness; then, heating was performed at 80° C. for 2 hours to encapsulate the chip.

Example 3

The film having an average film thickness of 100 μm obtained in Example 1 was cut to a size of 1 cm×1 cm and subjected to a light resistance test (200 continuous lighting test). The details of the test are as follows.

Figure 3:
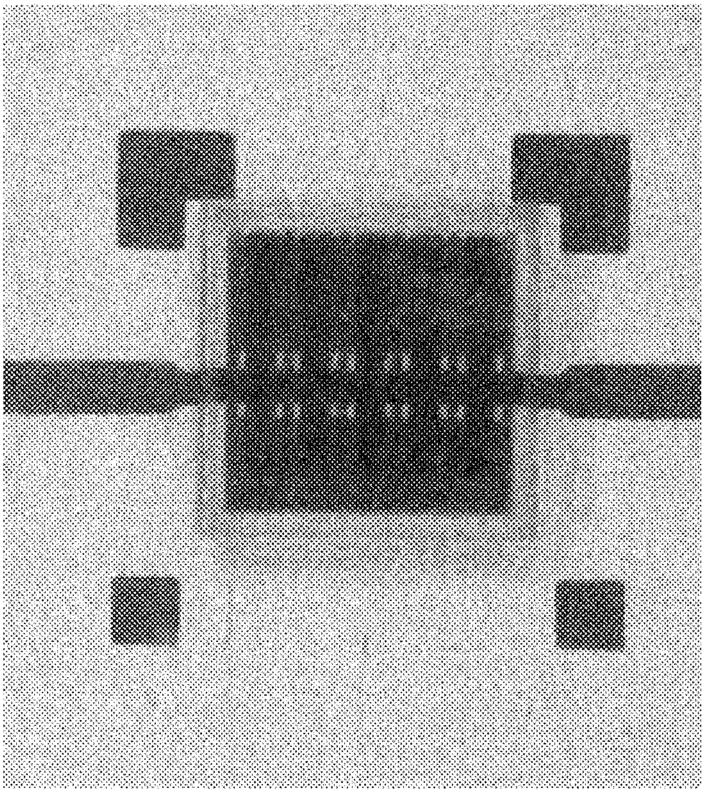
FIG. 3 is a photograph of a UV LED chip and a film after 200 hours in the light resistance test of Example 3.

On an aluminum substrate (1) (thickness: 1.6 mm) on which a UV-LED chip (3) (size: 1.15 mm×1.15 mm; emission wavelength: 276 nm; rated maximum: 6.4 V when the forward current (IF) is 350 mA; output 30 mW when 2 W is supplied; produced by DOWA) was mounted, a doughnut-shaped ceramic washer (4) (diameter: 10 mm; inner diameter: 5.3 mm; thickness: 2 mm) was placed such that the UV-LED chip was positioned inside of the washer, and bonded with a silicone resin. A test set was prepared by placing a film (5) on the washer such that the center of the washer almost coincided with the center of the film (FIG. 2). The film was fixed on the washer with an epoxy adhesive, and a light resistance test of the film was carried out by energizing the chip of the test set via electrodes (2) to cause UV light emission. As light emission conditions, the forward voltage (VF) was set to 5.0 V (IF=100 mA), and the junction temperature was set to 120° C. or lower, to minimize degradation of the UV-LED chip. After 200 hours, the radiant flux (measured with an integrating sphere) decreased only to 80 when the initial value at the start of the test was taken as 100, very high light resistance was shown, and no change in the appearance of the film was observed (FIG. 3).

Comparative Example 1

KER-2500 produced by Shin-Etsu Silicones, which is a commercially available LED encapsulation resin, was cured to prepare a film having an average film thickness of 100 μm, and the film was cut to 1 cm squares. The cut film was subjected to the same light resistance test as in Example 3.

Figure 4:
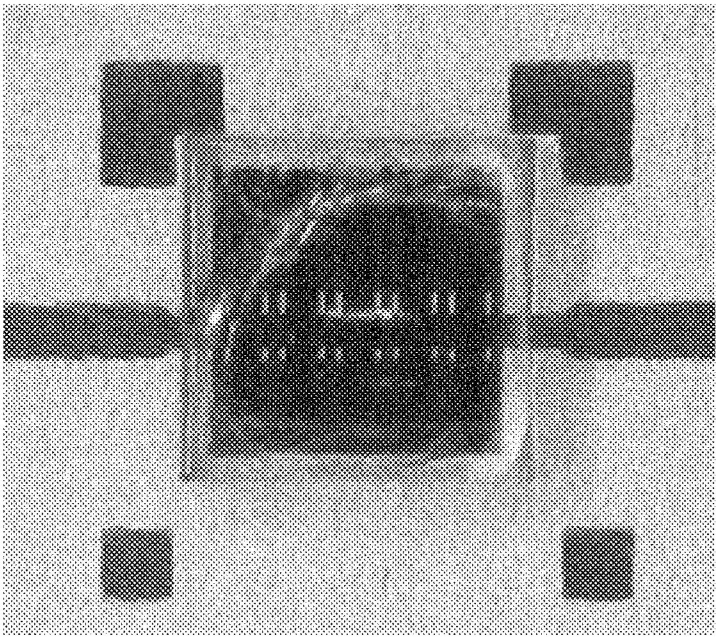
FIG. 4 is a photograph of a UV LED chip and a film after 25 hours in the light resistance test of Comparative Example 1.

After 25 hours, the film cracked; thus, the test was stopped. FIG. 4 is a photograph of the cracked film after 25 hours.

DESCRIPTION OF REFERENCE NUMERALS

1 Aluminum substrate
2 Electrode
3 UV-LED chip
4 Washer
5 Fluoropolymer film

The invention claimed is:

1. An encapsulation resin for light-emitting elements, comprising a fluoropolymer, wherein the fluoropolymer comprises a monomer unit represented by formula (1-1)

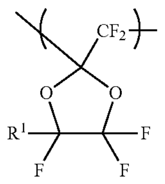

(1-1)

wherein $R^1$ is a fluorine atom, a fluoroalkyl group, or a fluoroalkoxy group, wherein the percentage of the monomer unit is 70 mol % or more based on the total monomer units in the fluoropolymer, wherein the fluoropolymer has a glass transition temperature of 110° C. or higher, and wherein the fluoropolymer has an indentation hardness of 250 $N/mm^2$ or more and 100 $N/mm^2$ or less.

2. The encapsulation resin according to claim 1, wherein the fluoropolymer further comprises a fluoroolefin unit.

3. The encapsulation resin according to claim 2, wherein the fluoroolefin unit is at least one member selected from the group consisting of a fluorine-containing perhaloolefin unit, a vinylidene fluoride unit, a trifluoroethylene unit, a pentafluoropropylene unit, and a 1,1,1,2-tetrafluoro-2-propylene unit.

4. The encapsulation resin according to claim 3, wherein the fluorine-containing perhaloolefin unit is at least one member selected from the group consisting of a chlorotrifluoroethylene unit, a tetrafluoroethylene unit, a hexafluoropropylene unit, a perfluoro(methyl vinyl ether) unit, a perfluoro (ethyl vinyl ether) unit, a perfluoro (propyl vinyl ether) unit, a perfluoro (butyl vinyl ether) unit, and a perfluoro (2,2-dimethyl-1,3-dioxol) unit.

5. The encapsulation resin according to claim 2, wherein the fluoroolefin unit is at least one member selected from the group consisting of a chlorotrifluoroethylene unit, a tetrafluoroethylene unit, a hexafluoropropylene unit, a perfluoro(methyl vinyl ether) unit, and a perfluoro (propyl vinyl ether) unit.

6. The encapsulation resin according to claim 1, wherein the fluoropolymer has an indentation elastic modulus of 2.5 GPa or more and 10 GPa or less.

7. The encapsulation resin according to claim 1, wherein the fluoropolymer has a total light transmittance of 90% or more.

8. The encapsulation resin according to claim 1, wherein the fluoropolymer has a transmittance of 60% or more at 193 nm or more and 410 nm or less.

9. The encapsulation resin according to claim 1, which is for ultraviolet-light-emitting elements.

10. A light-emitting element package comprising the encapsulation resin according to claim 1.
11. The encapsulation resin according to claim 1, wherein the monomer unit represented by formula (1-1) is the monomer unit represented by formula (1-11)
(1-11)
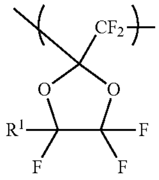
* * * * *